(12) United States Patent
Querejeta Andueza et al.

(10) Patent No.: US 10,863,862 B2
(45) Date of Patent: Dec. 15, 2020

(54) GAS COOKING APPLIANCE

(71) Applicant: Copreci, S. Coop., Aretxabaleta (ES)

(72) Inventors: Felix Querejeta Andueza, Hendaye (FR); Jose Ignacio Mugica Odriozola, Bergara (ES); Iñigo Albizuri Landazabal, Muxika (ES)

(73) Assignee: COPRECI, S. COOP., Aretxabaleta (ES)

( * ) Notice: Subject to any disclaimer, the term of this patent is extended or adjusted under 35 U.S.C. 154(b) by 167 days.

(21) Appl. No.: 16/294,162

(22) Filed: Mar. 6, 2019

(65) Prior Publication Data

US 2019/0274478 A1 Sep. 12, 2019

(30) Foreign Application Priority Data

Mar. 7, 2018 (EP) .................................... 18382140

(51) Int. Cl.
| | | |
|---|---|---|
| *A47J 37/07* | (2006.01) | |
| *F23D 14/58* | (2006.01) | |
| *F23D 14/28* | (2006.01) | |
| *F23D 14/22* | (2006.01) | |
| *F23D 14/10* | (2006.01) | |

(52) U.S. Cl.
CPC ........ *A47J 37/0713* (2013.01); *F23D 14/105* (2013.01); *F23D 14/22* (2013.01); *F23D 14/28* (2013.01); *F23D 14/58* (2013.01)

(58) Field of Classification Search
CPC ........ F23D 14/105; F23D 14/58; F23D 14/28; F23D 14/22; A47J 37/0737
USPC ........................................... 126/25 R
See application file for complete search history.

(56) References Cited

U.S. PATENT DOCUMENTS

| | | | | |
|---|---|---|---|---|
| 5,575,638 | A * | 11/1996 | Witham | F24C 3/126 431/73 |
| 7,096,887 | B2 * | 8/2006 | Tupa | F16K 11/083 137/625.47 |
| 8,001,957 | B2 * | 8/2011 | Clauss | F23N 1/005 126/42 |
| 9,140,457 | B2 * | 9/2015 | Deng | F24C 1/02 |
| 9,488,282 | B2 * | 11/2016 | Li | F16K 11/14 |
| 9,752,779 | B2 * | 9/2017 | Deng | F23N 1/002 |
| 9,803,773 | B2 * | 10/2017 | Zhang | F16K 11/0833 |
| 9,903,587 | B2 * | 2/2018 | Albizuri Landazabal | F16K 5/0207 |
| 2010/0032038 | A1 * | 2/2010 | Xie | F16K 11/0836 137/625.46 |
| 2017/0367532 | A1 | 12/2017 | Alden et al. | |

(Continued)

FOREIGN PATENT DOCUMENTS

| | | |
|---|---|---|
| CN | 205780987 U | 12/2016 |
| CN | 206830877 U | 1/2018 |

*Primary Examiner* — David J Laux
*Assistant Examiner* — Nikhil P Mashruwala
(74) *Attorney, Agent, or Firm* — Edell, Shapiro & Finnan, LLC

(57) ABSTRACT

A gas cooking appliance is disclosed that according to one embodiment includes at least one gas burner and a gas tap. The gas tap includes a gas inlet conduit and at least one gas outlet conduit suitable for conducting gas to the gas burner. An injector arranged fixed to the outlet conduit, the outlet conduit being in fluid communication with the injector with the injector providing an outlet for the gas flow to the burner. The injector includes at least two outlet holes for the exit of gas to the burner, with each outlet hole having a respective outlet mouth.

19 Claims, 7 Drawing Sheets

(56) References Cited

U.S. PATENT DOCUMENTS

2019/0274477 A1* 9/2019 Querejeta Andueza ...................... F23N 1/007
2020/0103108 A1* 4/2020 Bratti ...................... F23N 1/005

* cited by examiner

GAS COOKING APPLIANCE

CROSS-REFERENCE TO RELATED APPLICATIONS

This application relates to and claims the benefit and priority to European Application No. EP18382140.4, filed Mar. 7, 2018.

TECHNICAL FIELD

The present invention relates to gas cooking appliances.

BACKGROUND

Gas cooking appliances, such as, for example, a barbecue, comprising at least one gas burner and a gas tap in fluid communication with the gas burner, are known, where the burner is elongated and has many gas outlet ports, and where it is necessary to inject gas into the gas burner from the gas tap at a given speed and pressure so that the flame in all the outlet ports can be produced and have sufficient quality.

Elongated gas burner tubes with venturis arranged therein for use in gas barbecues are also known. U.S. Publication No. 2017/0367532A1 describes a burner assembly comprising an elongated burner tube with an upper surface comprising a plurality of gas outlet ports, a gas tap which is arranged at an open end of the gas burner for injecting a gas flow, the gas being mixed with air coming from the outside, and a venturi arranged at the open inlet of the gas burner, to direct the turbulent mixture of air and gas from the inlet of the gas burner, and turn it into gentle and consistent mixed flow of air and gas, towards the outlet ports of the gas burner.

Gas cooking appliances comprising at least one gas burner and a gas tap in fluid communication with the burner are known, the gas tap comprising a gas inlet conduit and at least one gas outlet conduit, the gas tap being suitable for regulating an incoming gas flow from the inlet conduit to the outlet conduit, the outlet conduit being suitable for conducting gas to the burner; and an injector arranged fixed to the outlet conduit, the outlet conduit being in fluid communication with the injector, with the injector providing an outlet for the gas flow to the burner.

SUMMARY

A gas cooking appliance is provided that comprises at least one gas burner, and a gas tap in fluid communication with the burner, the gas tap comprising a gas inlet conduit and at least one gas outlet conduit, the gas tap being suitable for regulating an incoming gas flow from the inlet conduit to the outlet conduit, the outlet conduit being suitable for conducting gas to the burner; and an injector arranged fixed to the outlet conduit, the outlet conduit being in fluid communication with the injector, with the injector providing an outlet for the gas flow to the burner.

The injector comprises at least two outlet holes for the exit of gas to the burner, with each outlet hole comprising a respective outlet mouth.

In the prior art, the gas tap of the gas cooking appliance comprises at least one injector, with the injector comprising a gas outlet hole. The gas burner comprises a venturi in an inlet mouth of the gas burner for directing the turbulent mixture of air, absorbed from the outside, and gas, injected from the outlet hole of the injector. The injector is introduced in the mouth of the venturi, allowing the venturi to turn the turbulent mixture into a gentle and consistent mixed flow of air and gas towards the outlet ports of the gas burner.

In the gas cooking appliance disclosed herein, since the injector of the gas tap comprises at least two outlet holes, the gas speed at the outlet of the outlet holes will be greater and the entrainment of air from the outside will also be enhanced, for the same gas flow rate as in the gas tap of the gas cooking appliance from the prior art. This significantly increases the proportion of air in the mixture with the gas. In this manner, the mixture of air and gas reaches all the outlet ports of the gas burner with sufficient pressure and with an improved proportion of air in the mixture, achieving a stable and good quality flame, whereby the venturi in the gas burner can be dispensed with.

These and other advantages and features will become apparent in view of the drawings and detailed description.

DETAILED DESCRIPTION

Figure 1A:
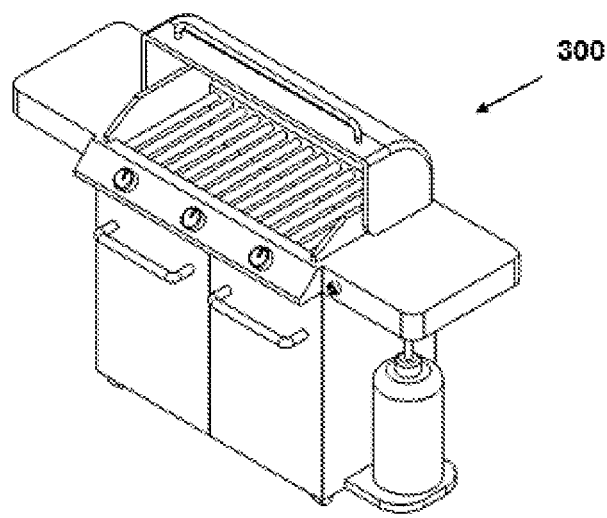
FIG. 1A shows a perspective view of a gas cooking appliance according to one embodiment.
Figure 1B:
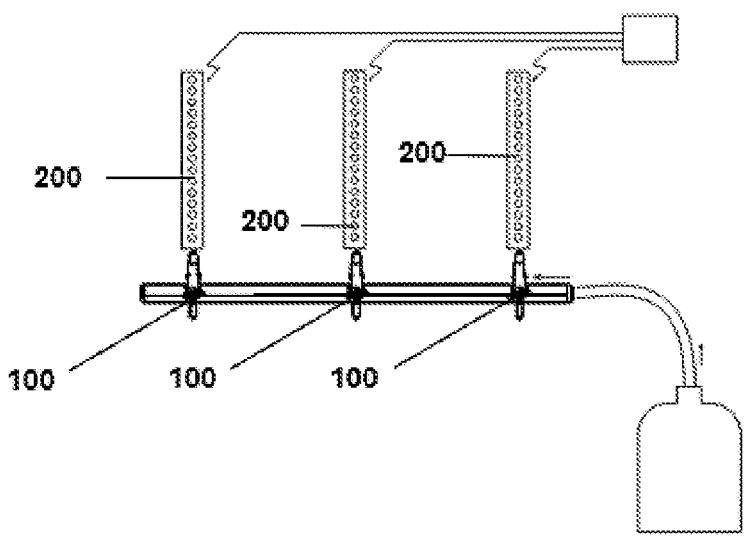
FIG. 1B shows a partial schematic view of the gas circuit of the gas cooking appliance of FIG. 1A.
Figure 2A:
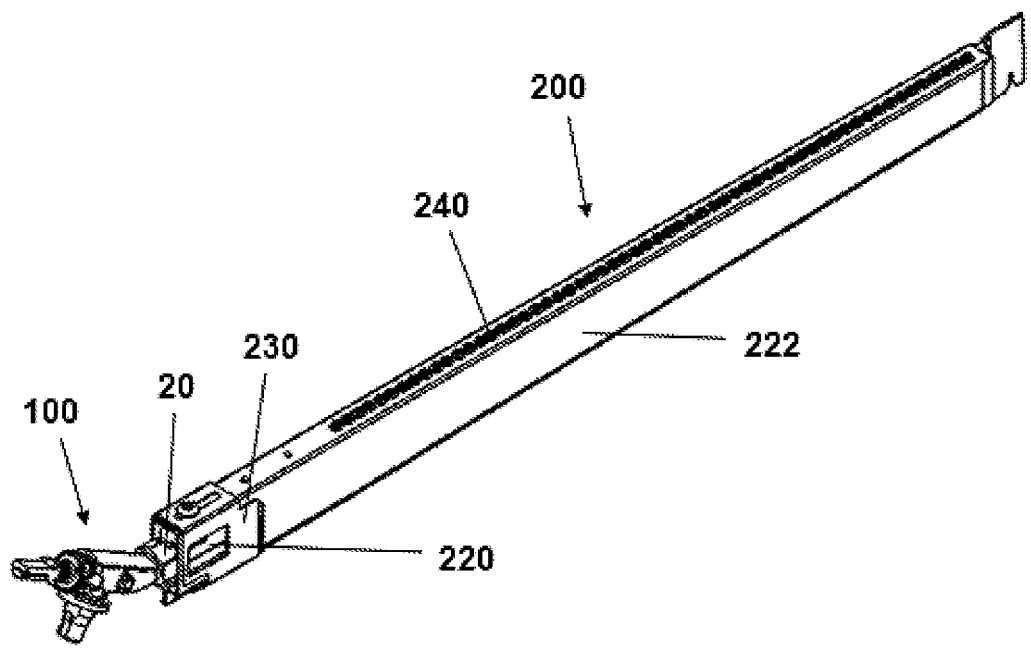
FIG. 2A shows a perspective view of a gas tap coupled to a gas burner of the gas cooking appliance of FIG. 1.
Figure 2B:
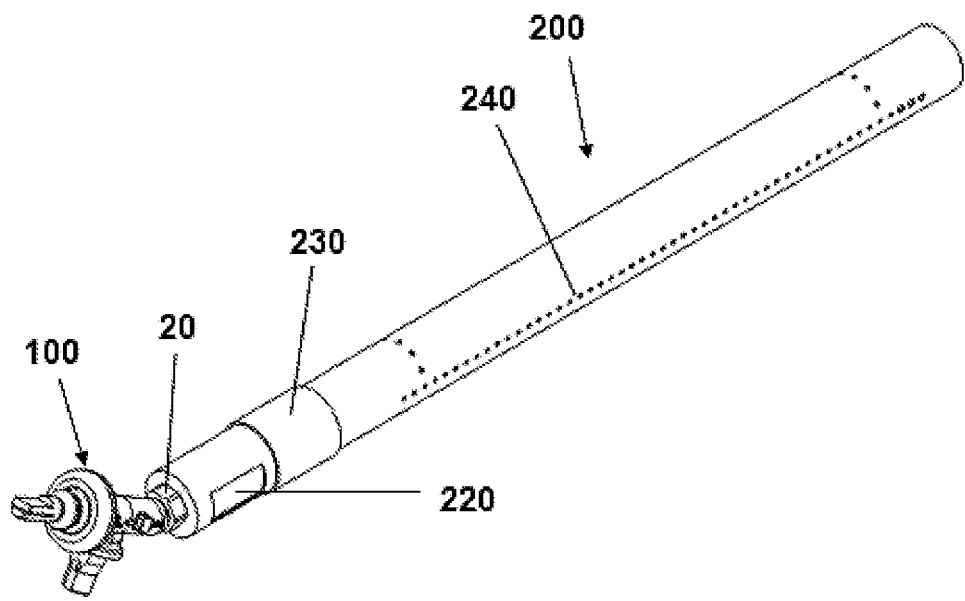
FIG. 2B shows a perspective view of a gas tap coupled to another embodiment of the gas burner.

FIG. 1 shows a perspective view of an embodiment of the gas cooking appliance 300 of the invention, and FIG. 1B shows a partial schematic view of the gas circuit of the gas cooking appliance 300 of FIG. 1A. In this embodiment, the gas cooking appliance 300 is a gas barbecue comprising three gas burners 200 and three gas taps 100 coupled to and in fluid communication with the three gas burners 200, respectively. FIGS. 2A and 2B show a perspective view of one of the gas taps 100 coupled, respectively, to two different embodiments of the gas burner 200 of the gas barbecue of FIG. 1, i.e., a gas burner 200 with a substantially rectangular cross-section in FIG. 2A in which the longer sides (vertical walls 222) of the section are arranged vertically, and a gas burner 200 with a substantially circular cross-section in FIG. 2B.

These gas burners 200 have a general elongated tube shape and comprise along the length thereof a plurality of gas outlet ports 240 on the upper surface thereof, as shown in FIGS. 2A and 2B. The gas tap 100 is arranged at an open end of the gas burner 200 in an inlet mouth 210 for injecting a gas flow. The injected gas is mixed with the outside air coming from air absorption windows 220 which are arranged in the shown embodiments on each of the sides of the gas burner 200 of FIGS. 2A and 2B.

Figure 4:
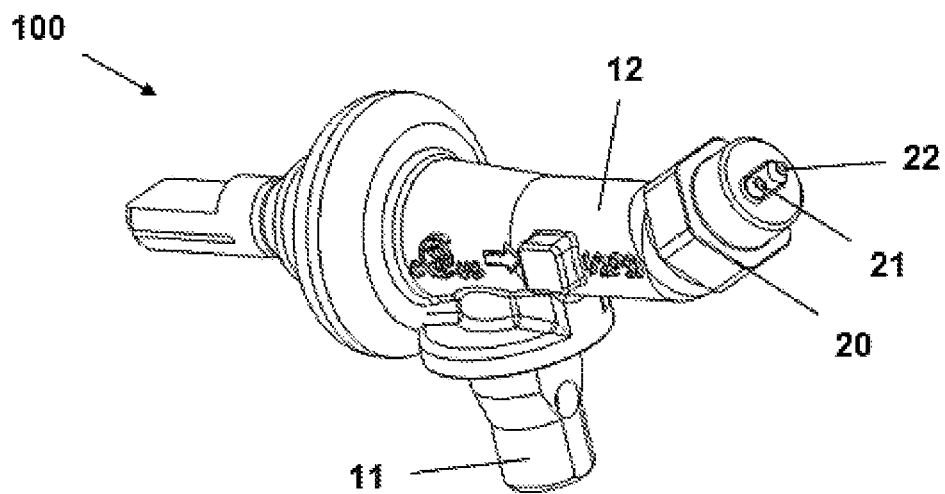
FIG. 4 shows a perspective view of the gas tap of the gas cooking appliance of FIG. 1, with an embodiment of a liquefied petroleum gas LPG injector, with two outlet holes in the horizontal position.

The gas tap 100 includes a valve body comprising a gas inlet conduit 11 for the entry of gas supplied from an external source. In this embodiment of the gas tap 100, the valve body also comprises a gas outlet conduit 12 which is suitable for conducting gas into the burner 200, and a rotating regulating element (not depicted) housed in the valve body. The regulating element comprises a plurality of connection openings for regulating the incoming gas flow from the inlet conduit 11 to the outlet conduit 12, by varying an outlet gas flow rate in the outlet conduit 12. In this manner, the flow rate of the gas flow exiting the gas tap 100 is regulated at the outlet conduit 12 depending on the angular position of the regulating element 20 on an angular path. To provide an outlet for the regulated gas flow, the gas tap 100 comprises, as shown in FIG. 4, an injector 20 arranged fixed at one end of the outlet conduit 12.

Figure 3:
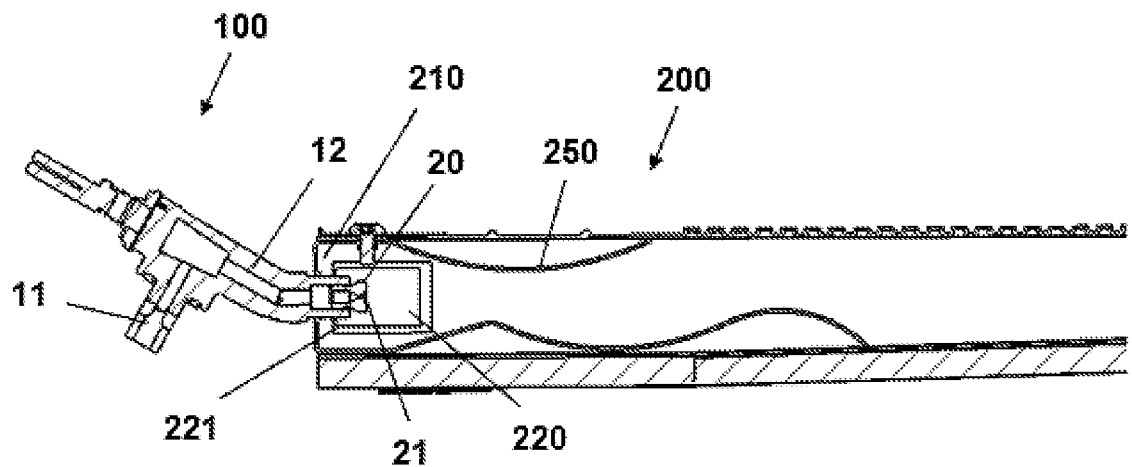
FIG. 3 shows a partial longitudinal section view of a gas tap coupled to a prior art gas burner.

FIG. 3 shows a partial longitudinal section view of a gas tap 100 coupled to a gas burner 200 from the prior art. In the prior art, it is common to arrange a venturi 250 at the inlet coupled to the gas burner 200. The gas tap 100 comprises an outlet conduit 12 at the end of which there is arranged an injector 20 with a gas outlet hole 21. The outlet conduit 12 is in fluid communication at a first end with a connection opening of the regulating element of the gas tap 100, for example a lower opening in the regulating element, and at a second end with the injector 20, providing an outlet for the gas flow through the outlet hole 21. When the regulating element rotates along a given angular path, the inner conduit of the outlet conduit 12 conducts a variable flow rate gas flow to the gas outlet hole 21. The outlet mouth of this outlet hole 21 is in a position located in approximately the first third with respect to the proximal end 221 of the air absorption windows 220.

This single outlet hole 21 is not able to provide a sufficient gas outlet speed, particularly in positions of the regulating element close to the minimum gas flow in which the gas pressure is quite a bit lower than the nominal supply pressure. Accordingly, it is not able to entrain an amount of air with sufficient speed and at a high proportion with respect to the amount of gas, from two air absorption windows 220 arranged on the sides of the gas burner 200 in the embodiment that is shown, to produce quality flame in all the outlet ports of the gas burner 200.

Figure 7:
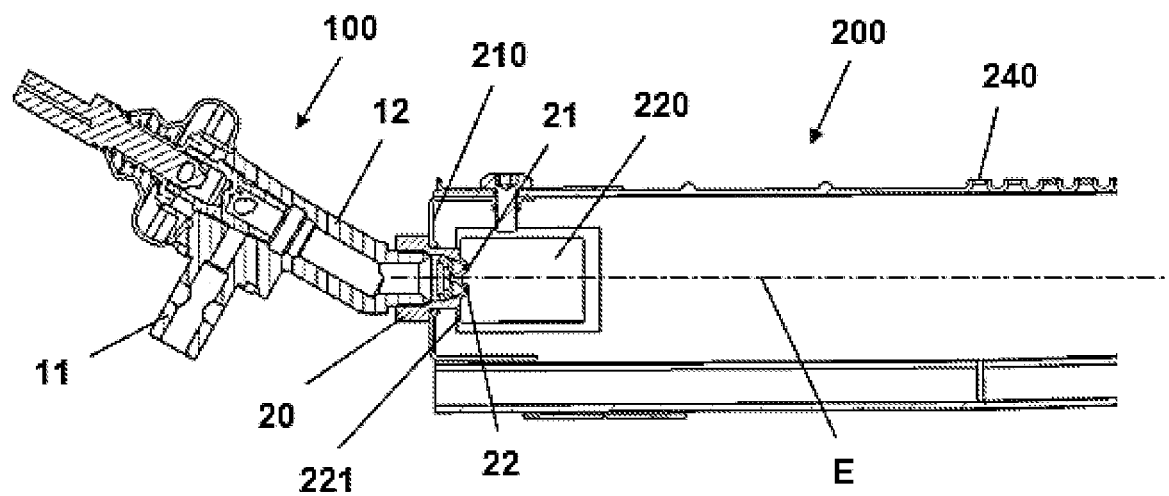
FIG. 7 shows a partial longitudinal section view of the gas tap coupled to a gas burner of FIG. 1, with an LPG injector with two outlet holes arranged in the vertical position.
Figure 8:
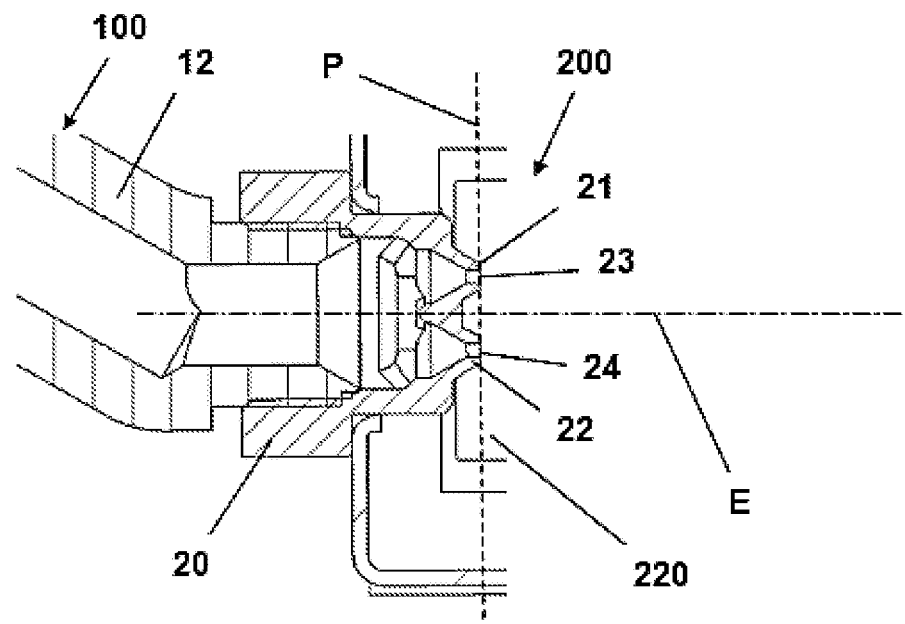
FIG. 8 shows a partial detailed longitudinal section view of the end of the gas tap coupled to a gas burner of FIG. 7.

To solve the mentioned problem, the gas cooking appliance 300 of FIG. 1, as shown in FIGS. 7 and 8, comprises in one embodiment a gas tap 100 coupled to a gas burner 200, with an injector 20 with the features described below.

Figures 5A, 5B:
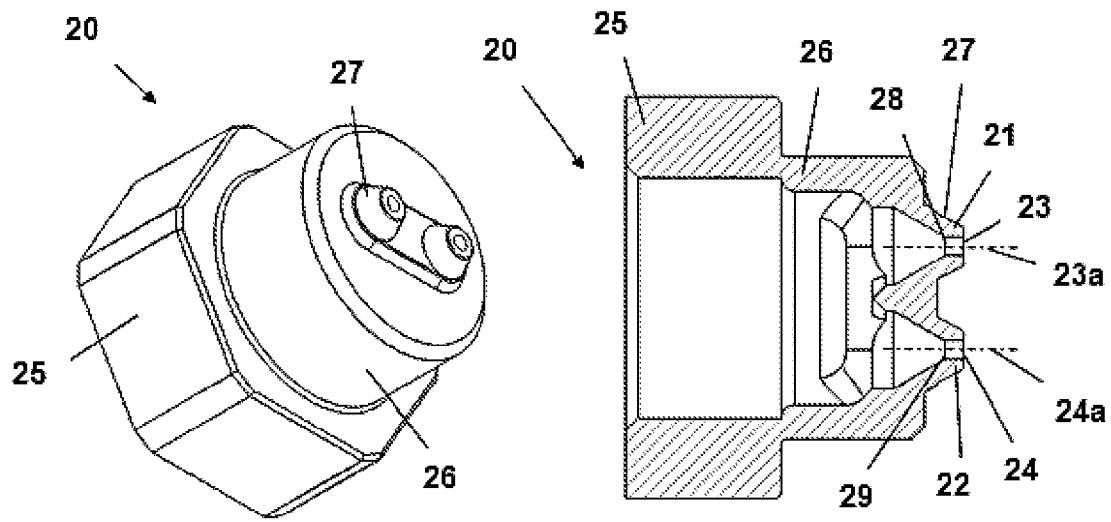
FIG. 5A shows a perspective view of the injector of FIG. 4.
FIG. 5B shows a section view of the injector of FIG. 5A.

FIGS. 5A and 5B, respectively, show a perspective view of an embodiment of the injector 20 for supplying liquefied petroleum gas LPG to the gas cooking appliance 300, the injector 20 comprising two outlet holes 21 and 22, and a section view of the injector 20 of FIG. 5B. The outlet mouths 23 and 24 of the two outlet holes 21 and 22 are aligned in a same plane. The outlet mouth 23 has a central axis 23*a* and outlet mouth 24 has a central axis 24*a*. In other embodiments of the gas cooking appliance 300, the injector 20 comprises more than two outlet holes, where these outlet holes may or may not be aligned in a same plane, and where the outlet holes in this latter case may form different configurations, forming a multi-injector.

Figures 6A, 6B:
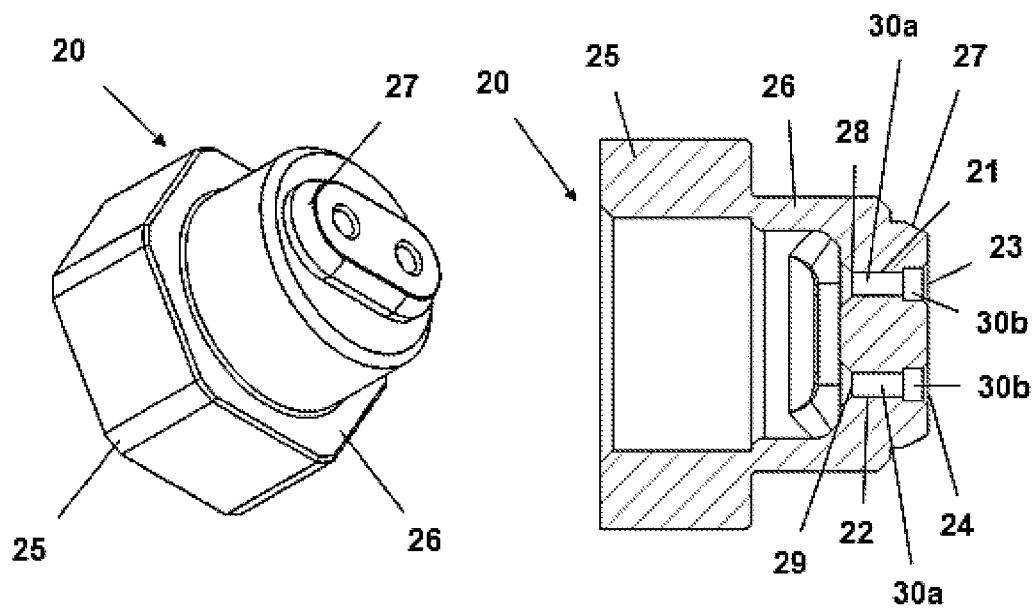
FIG. 6A shows a perspective view of another embodiment of an injector of the gas tap of the gas cooking appliance of FIG. 1 for natural gas NG, with two outlet holes.
FIG. 6B shows a section view of the injector of FIG. 6A.

FIGS. 6A and 6B, respectively, show a perspective view of another embodiment of the injector 20 for a natural gas NG supply to the gas cooking appliance 300, the injector 20 comprising two outlet holes 21 and 22. The two outlet holes 21 and 22 are aligned. Similarly, in other embodiments of the gas cooking appliance 300, the injector 20 comprises more than two outlet holes, where a multi-injector can be formed.

The injector 20, in either of its two embodiments, comprises at least a first body 25 and a second body 26 attached to one another. The first body 25 is a hexagonal body and forms the base of the injector 20. In this embodiment, the second body 26, attached to the first body 25 and providing continuity thereto, has a cylindrical shape and is attached at a base with the first body 25, with the second body 26 being narrower than the first body 25. At its other base and end of the injector 20, the second body 26 comprises an inclined wall 27 projecting, surrounding, and converging at the outlet holes 21, 22, The inclined wall 27 and the axis of the outlet holes 21 and 22 form an angle of inclination a of preferably 30°. In this manner, the absorption of the primary air from the outside has fewer impediments against mixing with the gas injected from the outlet holes 21 and 22, and the proportion of the primary air in the mixture of air and gas increases at the outlet ports 240 of the gas burner 200.

The outlet holes 21 and 22 go through the wall of the injector 20 and comprise a respective outlet mouth 23 and 24 in the gas flow direction. The outlet mouths 23 and 24 are arranged in a relative position with respect to air absorption windows 220. In the embodiment of the gas tap 100 coupled to the gas burner 200 of the gas cooking appliance 300 shown in FIGS. 7 and 8, the injector 20 is for LPG with two outlet holes 21 and 22 arranged in the vertical position on the vertical longitudinal plane of the gas burner 200, with the outlet holes 21 and 22 of the gas tap 100 being arranged centered in height with respect to the air absorption windows 220. In this embodiment, unlike the gas tap 100 from the prior art, the outlet mouths 23 and 24 of the outlet holes 21 and 22 are arranged approximately at the beginning of the air absorption windows 220, although in other (non-depicted) embodiments, they can be arranged further behind with respect to the beginning of the air absorption windows 220, for example 5 millimeters, or they may be arranged slightly in front of same.

In the embodiment of the gas cooking appliance 300, since the injector 20 of the gas tap 100 comprises two outlet holes 21 and 22 for a given gas flow rate, which is injected in the gas tap of the gas cooking appliance from the prior art, through a single outlet hole 21, the area of the outlet holes 21 and 22 is half the area of the single hole 21 of the injector from the prior art, and the gas speed at the outlet of each of the outlet holes 21 and 22 will be greater and the entrainment of air from the air absorption windows 220 will also be enhanced. This combined with the fact that the outlet mouths 23 and 24 of the outlet holes 21 and 22 of the injector 20 are arranged at the beginning of each air absorption window 220 means that the proportion of air in the mixture with gas increases significantly. In this manner, the mixture of air and gas therefore reaches all the outlet ports 204 of the gas burner 200 with sufficient pressure and with an improved proportion of air in the mixture, achieving a stable and good quality flame, where the venturi in the gas burner can be dispensed with.

In the embodiment that is shown in FIG. 8, the outlet mouths 23 and 24 of the outlet holes 21 and 22 are arranged on a plane P perpendicular to a longitudinal axis E of the burner 200, and the axes of the outlet holes 21 and 22 of the gas tap 100 are parallel to the longitudinal axis E of the burner 200, although in other embodiments the axes of the outlet holes may form different angles with respect to axis E.

In the embodiment that is shown, the gas burner 200 comprises two air absorption windows 220 and the injector 20 comprises two outlet holes 21 and 22 arranged in the vertical position, the gas burner 200 comprising an inlet mouth 210 where the end of the outlet conduit 12 is coupled and centered in the inlet mouth 210. The outlet holes 21 and 22 are therefore arranged at the same distance from the respective air absorption window 220. In other embodiments in which there are more than two outlet holes, the latter being aligned with one another, and with the orientation of the outlet holes not being vertical, the outlet hole of each end of the alignment of the outlet holes is arranged on the side of the air absorption windows 220. Therefore, significant entrainment of air by the injected gas occurs at all times.

When the gas being supplied is liquefied petroleum gas LPG, like in the embodiment shown in FIGS. 7 and 8, the outlet holes 21 and 22 of the injector 20 have a cylindrical shape, with the diameter of the outlet holes 21 and 22 in the respective outlet mouths 23 and 24 being equal to the diameter of respective inlet mouths 28 and 29, i.e., they have one and the same diameter along the length thereof.

When the gas being supplied is natural gas NG, the outlet holes 21 and 22 of the injector 20 have a cylindrical shape with two different diameters along the length thereof. There is a first cylinder from the inlet mouths 28 and 29 with a first chamber 30a of a first diameter, and there is a second cylinder which forms a second chamber 30b that ends in the outlet mouths 23 and 24, the diameter of the second chamber being greater than the diameter of the first chamber. The diameter of the outlet holes is larger when the gas being supplied is NG than the diameter of the outlet holes when the gas being supplied is LPG. This combined with the fact that the nominal LPG supply pressure is about 28 to 30 millibars, that the NG pressure is lower than about 20 millibars or less, and that less air is needed in the mixture of air and gas when the gas being supplied is NG, makes it necessary to have the second chambers 30b in the outlet mouths 23 and 24 of the outlet holes 21 and 22, given that turbulences are thereby generated in the chambers 30b, and the exit of the injected gas is curbed, entraining a smaller amount of air as a result.

Figure 9:
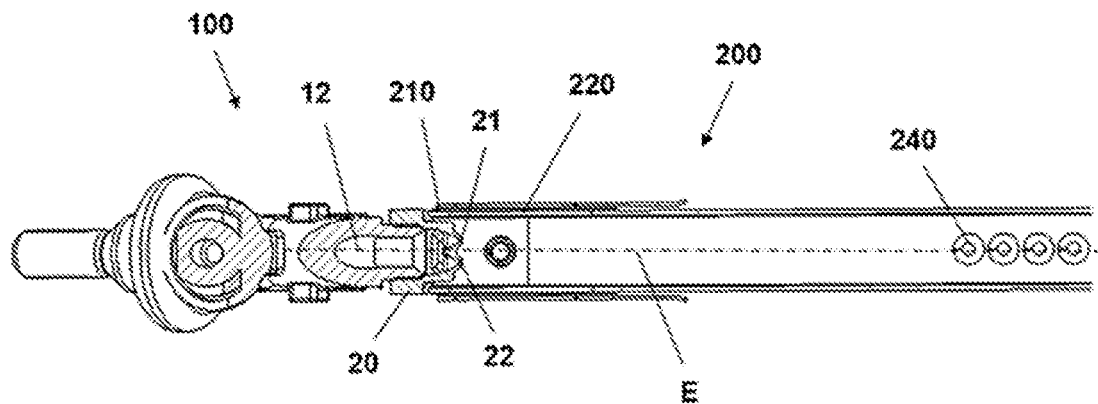
FIG. 9 shows a partial longitudinal section view of the gas tap coupled to a gas burner of FIG. 1, with an LPG injector with two outlet holes arranged in the horizontal position.
Figure 10:
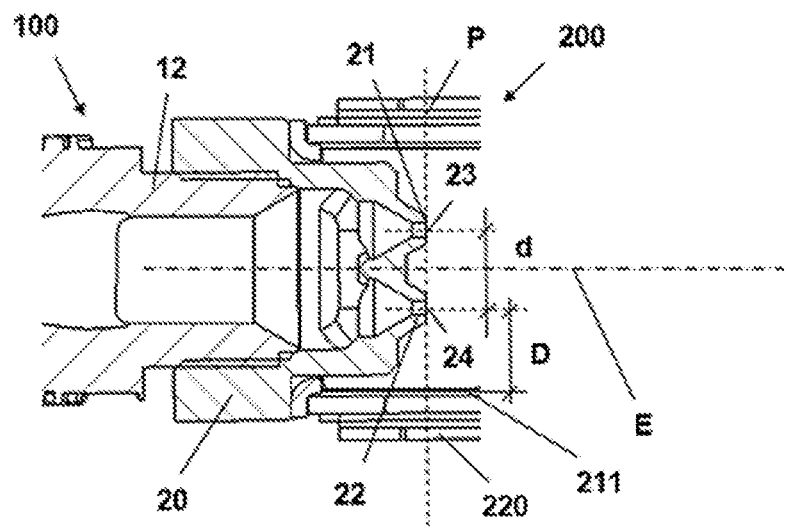
FIG. 10 shows a partial detailed top longitudinal section view of the end of the gas tap coupled to a gas burner of FIG. 9.

FIGS. 9 and 10 show a partial longitudinal section view of the gas tap 100 coupled to a gas burner 200 of FIG. 1, with an LPG injector with two outlet holes 21 and 22 arranged in the horizontal position, and FIG. 10 shows a partial detailed top longitudinal section view of the end of the gas tap 100 coupled to a gas burner 200 of FIG. 9. The rest of the features of the gas tap 100 and the gas burner 200 are the same. In this embodiment, the axes of the outlet holes 21 and 22 are arranged at the same distance d as the axes of the outlet holes 21 and 22 in the first embodiment of the gas tap 100. In this embodiment, as the outlet holes 21 and 22 are arranged horizontally, each of the outlet holes 21 and 22 is located next to the respective air absorption window 220, and the distance D between the axis of the outlet holes 21 and 22 and the closest wall 211 of the air absorption window 220 is greater than the distance d between the axes of the outlet holes 21 and 22.

In this embodiment, the axes of the outlet holes 21 and 22 are arranged at a distance d, preferably less than or equal to 5 millimeters, such that the injection of gas from each outlet hole 21 and 22 forms a compact and consistent assembly which gently directs the gas to the outlet ports 240 without requiring a venturi. Distance d is smaller than distance D, such that enough space is created between each outlet hole 21 and 22 and the air absorption windows 220 for the outside air to be absorbed with no trouble, obtaining an even better primary air entrainment ratio than when the outlet holes 21 and 22 are vertically arranged.

Figure 11:
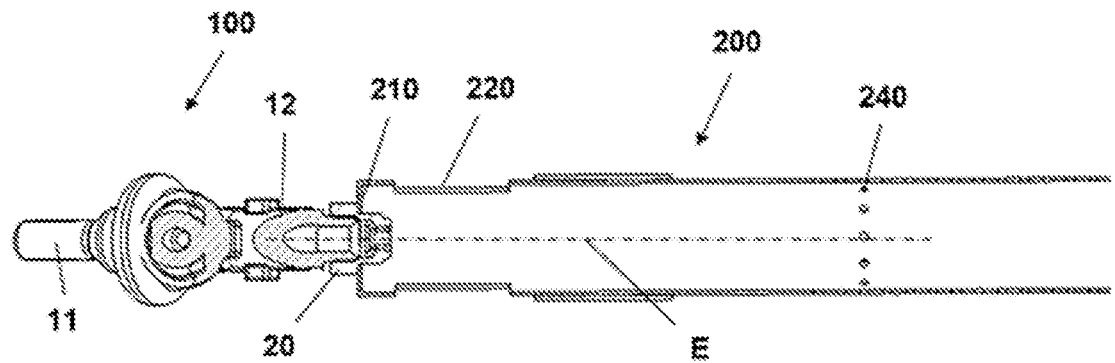
FIG. 11 shows a partial longitudinal top section view of the gas tap coupled to a gas burner of FIG. 2B, with an NG injector with two outlet holes arranged in the horizontal position.
Figure 12:
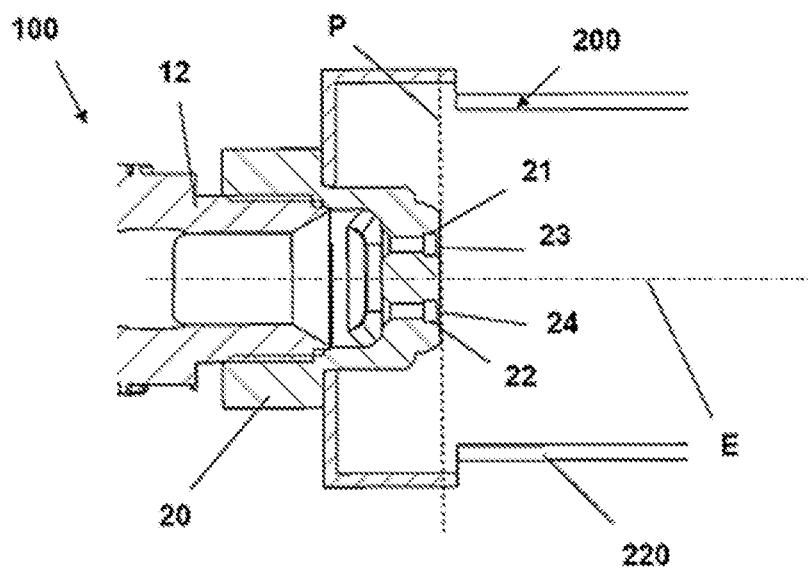
FIG. 12 shows a partial detailed longitudinal top section view of the end of the gas tap coupled to a gas burner of FIG. 11.

FIGS. 11 and 12 show a partial top longitudinal section view of the gas tap 100 coupled to a gas burner of FIG. 2B, with an NG injector 20 with two outlet holes arranged in the horizontal position, and FIG. 12 shows a partial detailed top longitudinal section view of the end of the gas tap 100 coupled to a gas burner 200 of FIG. 11. The difference of this embodiment is that it is an NG injector 20 with the features described above. The rest of the features of the gas tap 100 and the gas burner 200 are the same.

The following clauses, in an unlimited way, disclose additional implementations

Clause 1. A gas cooking appliance comprising at least one gas burner (200), and a gas tap (100) in fluid communication with the burner (200), the gas tap (100) comprising a gas inlet conduit (11) and at least one gas outlet conduit (12), the gas tap (100) being suitable for regulating an incoming gas flow from the inlet conduit (11) to the outlet conduit (12), the outlet conduit (12) being suitable for conducting gas to the burner (200); and an injector (20) arranged fixed to the outlet conduit (12), the outlet conduit (12) being in fluid communication with the injector (20), with the injector (20) providing an outlet for the gas flow to the burner (200), characterized in that the injector (20) comprises at least two outlet holes (21, 22) for the exit of gas to the burner (200), with each outlet hole (21, 22) comprising a respective outlet mouth (23, 24).

Clause 2. A gas cooking appliance according to clause 1, wherein the burner (200) comprises two side air absorption windows (220), with the outlet holes (21, 22) of the gas tap (100) being arranged centered with respect to the air absorption windows (220).

Clause 3. A gas cooking appliance according to clause 2, wherein the outlet mouths (23, 24) of the outlet holes (21, 22) of the gas tap (100) are arranged horizontally aligned in the burner (200).

Clause 4. A gas cooking appliance according to clause 3, wherein the distance (d) between the outlet holes (21, 22) is smaller than the distance (D) between each air absorption window (220) and the outlet hole (21, 22) adjacent to the respective air absorption window (220).

Clause 5. A gas cooking appliance according to clause 4, wherein the distance (d) between the axes of the outlet holes (21, 22) is less than or equal to 5 millimeters.

Clause 6. A gas cooking appliance according to clause 2, wherein the outlet mouths (23, 24) of the outlet holes (21, 22) of the gas tap (100) are arranged vertically aligned in the burner (200).

Clause 7. A gas cooking appliance according to any of clauses 2 to 6, wherein the outlet mouths (23, 24) of the outlet holes (21, 22) of the gas tap (100) are arranged, in the gas flow direction, at the same level as the beginning of the air absorption windows (23, 24) or slightly in front of or behind same.

Clause 8. A gas cooking appliance according to any of the preceding clauses, wherein the outlet holes (21, 22) of the gas tap (100) are parallel to a longitudinal axis of the burner (200).

Clause 9. A cooking appliance according to clause 8, wherein the outlet mouths (23, 24) of the outlet holes (21, 22) of the gas tap (100) are contained on one and the same vertical plane.

Clause 10. A gas cooking appliance according to any of the preceding clauses, wherein the injector (20) comprises at least a first body (25) and a second body (26) attached to one another, with the outlet holes (21, 22) being arranged at one end of the second body (26) in the gas flow direction, the second body (26) being narrower than the first body (25).

Clause 11. A gas cooking appliance according to the preceding clause, wherein the second body (26) comprises an inclined wall (27) surrounding and converging at the outlet holes (21, 22), the inclined wall (27) and the axis of the outlet holes (21, 22) forming an angle of inclination (α) of preferably 30°.

Clause 12. A gas cooking appliance according to any of the preceding clauses, wherein the outlet holes (21, 22) of the gas tap (100) have one and the same diameter along the length thereof.

Clause 13. A gas cooking appliance according to any of clauses 1 to 12, wherein each outlet hole (21, 22) of the gas tap (100) comprises a chamber (30) in the respective outlet mouth (23, 24) with a diameter larger than the diameter of the rest of the outlet hole (21, 22).

Clause 14. A gas cooking appliance according to any of the preceding clauses, wherein the cross-section of the burner (200) comprises four sides.

Clause 15. A gas cooking appliance according to any of clauses 1 to 13, wherein the cross-section of the burner (200) is circular.

What is claimed is:

1. A gas cooking appliance comprising:
a gas burner having an inlet mouth,
a gas tap in fluid communication with the burner, the gas tap including a body with a gas inlet conduit and a gas outlet conduit, the gas tap being configured to receive a gas at the inlet conduit and to regulate a flow rate of the gas to the outlet conduit; and
an injector fixed to the gas tap body, the injector including first and second outlet holes in fluid communication with the outlet conduit of the gas tap, the first and second outlet holes respectively having first and second outlet mouths located inside the inlet mouth of the gas burner; wherein the gas burner includes first and second side air absorption windows, the first and second outlet mouths of the injector being located in a space separating the first and second air absorption windows.

2. The gas cooking appliance according to claim 1, wherein the gas burner includes first and second side air absorption windows, the first and second outlet mouths of the injector being centered in a space separating the first and second air absorption windows.

3. The gas cooking appliance according to claim 1, wherein the gas burner includes first and second side air absorption windows, the first and second outlet mouths being respectively spaced apart from the first and second air absorption windows by a same distance.

4. The gas cooking appliance according to claim 3, wherein the gas burner includes first and second elongate vertical walls that are horizontally spaced apart from one another, the first and second air absorption windows respectively residing in the first and second elongate vertical walls, the first and second outlet mouths being horizontally aligned with respect to one another.

5. The gas cooking appliance according to claim 4, wherein the first and second air absorption windows are arranged parallel to one another.

6. The gas cooking appliance according to claim 4, wherein the first outlet mouth has a first central axis and the second outlet mouth has a second central axis, the first and second central axes being horizontally separated by a first distance, the first central axis being horizontally separated from the first air absorption window by a second distance and the second central axis being horizontally separated from the second air absorption window by a third distance, the first distance being less than each of the second and third distances.

7. The gas cooking appliance according to claim 6, wherein the first distance is less than or equal to 5 millimeters.

8. The gas cooking appliance according to claim 3, wherein the gas burner includes first and second elongate vertical walls that are horizontally spaced apart from one another, the first and second air absorption windows respectively residing in the first and second elongate vertical walls, the first and second outlet mouths being vertically aligned with respect to one another.

9. The gas cooking appliance according to claim 3, wherein each of the first and second air absorption windows respectively has a proximal end located nearest the gas tap, the first and second outlet mouths being respectively located at the proximal end of the first and second air absorption windows.

10. The gas cooking appliance according to claim 3, wherein each of the first and second air absorption windows respectively has a proximal end located nearest the gas tap, the first and second outlet mouths being respectively located proximal to the proximal end of the first and second air absorption windows.

11. The gas cooking appliance according to claim 3, wherein the first outlet mouth includes a first central axis and second outlet mouth includes a second central axis, each of the first and second axes being parallel to a longitudinal axis of the burner.

12. The gas cooking appliance according to claim 3, wherein when the gas burner is in use the gas travels distally through the injector in a gas flow direction into the gas burner, the injector including a first body and a second body attached to one another, the first body being located proximal to the second body, the first and second outlet holes being located at a distal end of the second body, the first and second bodies respectively having first and a second outer perimeter profiles, the first outer perimeter profile being greater than the second outer perimeter profile.

13. The gas cooking appliance according to claim 3, wherein the first and second outlet holes each have a same length and a same diameter along the entirety of the length.

14. The gas cooking appliance according to claim 3, wherein each of the first and second outlet holes comprises a proximal chamber and a distal chamber, the first and second outlet mouths residing at a distal end of the distal chamber, the proximal chamber having a first diameter and the distal chamber having a second diameter that is greater than the first diameter.

15. The gas cooking appliance according to claim 3, wherein the gas burner includes a cylindrical wall, the first and second air absorption windows respectively residing in a first side of the cylindrical wall and a second side of the cylindrical wall, the first and second air absorption windows being arranged facing one another.

16. The gas cooking appliance according to claim 15, wherein the first and second air absorption windows are arranged parallel to one another.

17. The gas cooking appliance according to claim 15, wherein the first outlet mouth has a first central axis and the second outlet mouth has a second central axis, the first and second central axes being separated by a first distance, the first central axis being separated from the first air absorption window by a second distance and the second central axis being separated from the second air absorption window by a third distance, the first distance being less than each of the second and third distances.

18. The gas cooking appliance according to claim 17, wherein the first distance is less than or equal to 5 millimeters.

19. The gas cooking appliance according to claim 3, wherein the gas burner does not include a venturi.

* * * * *